Patented Nov. 7, 1944

2,362,431

UNITED STATES PATENT OFFICE 2,362,431

THERMOFLUID PRINTING INKS AND VEHICLES THEREFOR

Lothian M. Burgess, Chatham, N. J., assignor to J. M. Huber, Inc., New York, N. Y., a corporation of New Jersey No Drawing. Application July 8, 1941, Serial No. 401,523

11 Claims. (Cl. 260—25)

This invention relates to new and useful improvements in normally solid, thermo-fluid printing inks for use in printing according to what has become known as the "Cold Set" printing process. In that process normally solid ink is heated and melted and then printed in thin molten films onto relatively cold stock so that the ink films freeze immediately to form dry prints adhering to the surface of the stock.

This invention is an improvement or modification of the disclosure in the co-pending application of myself and others, for Printing ink for which United States Letters Patent No. 2,268,595 were issued on January 6, 1942.

Thermo-fluid printing inks must consist of pigments or other suitable coloring material dispersed in normally solid vehicles which will impart the required physical qualities to the inks. Among the requirements which enter into commercial "Cold Set" printing work are that the molten ink have a satisfactory fluidity, body, tack and cohesiveness for distribution on the press and for printing at elevated temperatures, that it set quickly when printed, before objectionable penetration into the paper stock, and that the print be even and sufficiently hard and free from tack to resist abrasion, smudging or other damage during further printing operations or during the normal use of the printed matter. These requirements are accentuated in the printing of newspapers or other printed matter at high press speeds, wherein, in addition, the ink must have an exceptionally high fluidity at elevated printing temperatures and must be inexpensive enough to be used in large volume.

In the printing of colors according to the "Cold Set" process, there are the further requirements that the inks possess desirable color and tone qualities, that they be capable of blending in color and "trapping," or superimposing, satisfactorily if to be used in "process," or multi-color, printing, and that the ink vehicles be compatible with the various pigments used in compounding colored inks.

Many of the thermo-fluid inks heretofore used successfully for high speed newspaper printing or the like have contained substantial proportions of gilsonite. Gilsonite is a hard bituminous resin of dark brown or black color that imparts desirable printing qualities to the molten inks, particularly when used with substantial proportions of hard thermo-plastic resins, such as cumarone resins and hardened rosins or rosin derivatives, which in contrast to the "length" or stringiness of molten gilsonite are comparatively "short" when molten. When gilsonite is so used in colored inks, however, its natural dark color debases the color values of bright pigments and causes the printed ink to have a dull or "muddy" tone. Colored thermo-fluid inks containing substantial amounts of gilsonite therefore are not suitable either for the printing of bright colors or for multi-color printing work.

It is accordingly the principal object of my invention to provide improved thermo-fluid printing inks which are bright in color, which have printing qualities and other physical qualities satisfactory for high speed commercial printing work, and which are low enough in cost to be used for color printing in large volume.

Another object of my invention is to provide thermo-fluid printing inks which have color qualities, printing qualities and trapping qualities rendering them suitable for use in multi-color "Cold Set" printing.

A further object of the invention is to provide light-colored or pale thermo-fluid ink vehicles which possess physical and chemical qualities rendering them valuable for use in the compounding of variously colored thermo-fluid printing inks comprising various types of pigments.

According to the present invention, I have found that the foregoing and other desirable objects and advantages may be attained by compounding thermo-fluid ink vehicles, and from them improved inks, with a special hard thermoplastic resin base which contains a substantial proportion of a phenolic-modified natural resin or natural resin ester, by which I mean a natural resin or an ester thereof that has been reacted with or modified by phenol-aldehyde resin.

The most common natural resins and natural resin esters available for modification and use pursuant hereto are rosin and copal and their respective glycerol esters, namely, ester gum and copal ester. Esters of rosin and copal with other polyhydric alcohols, such as polyglycerol, glycol and polyglycol, also may be employed. These resins and esters may be modified by phenol-aldehyde resins in several known ways so as to obtain products which remain permanently fusible, which are compatible with the other resins and the oily and waxy materials employed in thermo-fluid inks, and which have higher melting points and greater hardness at normal temperatures than the corresponding unmodified resins and esters. For example, the natural resin or ester may be reacted with the resinous product of the reaction between a phenol and an aldehyde; or a phenol and an aldehyde may be reacted in the presence of the resin or ester; or a natural resin may be reacted with a phenol-aldehyde resin, during or after which the product of that reaction may be esterified with a polyhydric alcohol, such as glycerol, as disclosed in United States Patents Nos. 1,623,901, 1,800,295 and 2,052,093.

I have found that such phenolic-modified products, and especially the products of reactions between natural resins, glycerol and heat-convertible phenol-formaldehyde resins, contribute a desirable quality of "length" or stringiness to molten thermo-fluid printing inks, and that valuable inks may be obtained by using such products in combination with comparatively "short" hard thermo-plastic resins, such as cumarone resins, hardened rosins and rosin derivatives. Furthermore, thermo-fluid ink vehicles made with this resin combination as herein disclosed have a light color and other physical and chemical qualities which permit them to be compounded satisfactorily with various types of pigments and toners or dyes, in various proportions, so as to obtain valuable thermo-fluid inks having desired colors and tones, either bright or dark. The physical qualities of the resulting inks, both at ordinary temperatures and at elevated printing temperatures, make them particularly useful in high speed letter-press printing by the "Cold Set" process, as in the printing of newspapers, magazines and the like. In addition, these inks may have color and trapping qualities suitable for multi-color printing; and they are compatible with most of the pigments employed in colored inks.

The phenolic-modified resin constituent of my inks and vehicles may be procured commercially in prepared form or may be prepared from readily available substances prior to or in the course of compounding the new inks. An example of a suitable commercial product is a product of Reichold Chemicals, Inc., known as "Beckopol," which is a phenolic-modified copal ester. A suitable product may be prepared, for example, by heating a natural resin or an ester thereof, such as "Ester Gum #125," a glycerol ester of rosin produced by American Cyanamid Company, with a smaller amount of an oil-soluble, heat-convertible phenol-formaldehyde resin such as "Super-Beckacite 1001," another product of Reichold Chemicals, Inc. When following this particular example the heating usually is carried out slowly to about 450° F., until foaming has substantially ceased.

The thermo-fluid ink vehicles of this invention generally are made from a special resin combination as aforesaid, wherein the content of comparatively short resin predominates over the content of phenolic-modified resin, together with a substantial proportion of hard waxy material. This waxy material may be natural wax or a synthetic wax or wax substitute; or both waxes and wax substitutes may be used. Suitable natural waxes are carnauba wax, candelilla wax, Montan wax and certain high melting paraffin waxes. Suitable synthetic waxes or wax substitutes are normally solid hydrogenated oils, such as hydrogenated soya bean oil, and hard waxy reaction products of alkylolamines and substantially saturated hydroxy fatty acids, of which a product of National Oil Products Company, known as "DBI" wax, is an example.

If desired, the vehicle may contain other organic plasticizing material, such as certain vegetable or mineral oils, soft or liquid resins, lithovarnish or the like, to impart desirable physical qualities to the molten ink and to serve in part as a substitute for waxy material; but such liquid or oily materials should be used only in a minor proportion, generally of less than 30%, that is insufficient to cause objectionable tack or stickiness in the ink at normal temperatures. In many cases it is advantageous to include in the vehicle a small amount, say about 1 to 5%, of a substance such as zinc resinate, zinc or lead naphthanate, lecithin or the like to improve the printing qualities of the molten ink, as set forth more particularly in a co-pending application of Jesse K. Boggs and myself, filed April 24, 1941, now United States Patent No. 2,361,740.

The inks embodying this invention which seem to have the most desirable compositions and characteristics hereof are those made with vehicles containing about 20 to 50% of the comparatively short resin, preferably a cumarone resin such as "Cumar V" or "Cumar W," and a smaller proportion between about 5 and 35% of the phenolic-modified resin. With this resin base there is included a substantial proportion, but usually not more than about 50%, of hard waxy material. When an oily or liquid plasticizing material also is used the content thereof is kept below 30%, and with a comparatively large content of such material only a small proportion of wax or other waxy material need be present.

In compounding the new inks, for example, the vehicle is first prepared by melting and mixing the ingredients in a suitably heated container, followed by stirring in of the coloring material, including any fillers, and then by repeated grinding. When the ink has been thoroughly ground, it is poured into containers or molds and allowed to cool. If the phenolic-modified natural resin or ester is to be prepared in conjunction with the compounding of the ink, this preferably is carried out first before incorporating the other ingredients of the vehicle, by heating or reacting the natural resin or ester thereof with phenol-formaldehyde resin, or with phenol and an aldehyde; and in the case of acidic natural resin this may be preceded, followed or accompanied, if desired, by esterification with polyhydric accohol from the group consisting of glycerol, polyglycerol, glycol and polyglycol.

The proportions of vehicle and coloring material to be used in compounding the inks vary with different vehicle formulae and with different pigments and colors, as will be readily understood in the art. Likewise, there may be variations in the composition of a given basic vehicle when the same vehicle is used with different pigments to produce inks of several different colors or color tones. Such variations, however, need not be great, and they may be effected readily by adding a small amount of an appropriate ingredient or ingredients to the basic vehicle during the compounding of any particular ink therefrom.

Following are examples of useful compositions embodying my invention:

Vehicle I

| | Parts by weight |
|---|---|
| Limed rosin | 40.5 |
| N wood rosin, reacted with | 24.0 |
| Superbeckacite 1001 | 7.5 |
| Cotton seed oil | 25.5 |
| Paraffin wax | 3.0 |
| | 100.5 |

Ink I-A—bright red

| | Parts by weight |
|---|---|
| Vehicle I | 100.5 |
| "Surfex" filler (calcium carbonate of low oil adsorption) | 7.0 |
| Lithol Red | 8.0 |
| | 115.5 |

Four-color process inks were made as follows:

Vehicle II

| | Parts by weight |
|---|---|
| Cumar W | 30 |
| Ester gum #125, reacted with | 14.7 |
| Superbeckacite 1001 | 7.3 |
| Carnauba wax | 20 |
| Litho oil #1 | 20 |
| | 92 |

Ink II-A, yellow

| | Parts by weight |
|---|---|
| Vehicle II | 92 |
| Zinc naphthenate | 2 |
| Hansa yellow | 10 |
| | 104 |

Ink II-B, red

| | Parts by weight |
|---|---|
| Vehicle II | 80 |
| Hydrogenated soya bean oil | 3 |
| Phloxine Red | 20 |
| | 103 |

Ink II-C, blue

| | Parts by weight |
|---|---|
| Vehicle II | 75 |
| Peacock Blue | 25 |
| | 100 |

Ink II-D, black

| | Parts by weight |
|---|---|
| Vehicle II | 92 |
| Hydrogenated soya bean oil | 5 |
| Zinc naphthenate | 2 |
| Carbon black and toners | 24 |
| | 123 |

Bright red, yellow and blue inks were made as follows:

Ink III-A, bright red

| | Parts by weight |
|---|---|
| Cumar V 2½ | 26 |
| Beckopol 1400 | 10 |
| Hydrogenated soya bean oil ("Hisor") | 42 |
| DBI wax, m. p. 91° C | 5 |
| Zinc resinate | 2 |
| Strontium lithol red | 11 |
| Chrome orange | 5 |
| | 101 |

Ink III-B, bright yellow

| | Parts by weight |
|---|---|
| Cumar V 2½ | 21 |
| Beckopol 1400 | 7 |
| Hydrogenated soya bean oil | 30 |
| DBI wax, 91° C | 4 |
| Chrome yellow | 40 |
| | 102 |

Ink III-C, bright blue

| | Parts by weight |
|---|---|
| Cumar V 2½ | 24 |
| Beckopol 1400 | 10 |
| Hydrogenated soya bean oil | 40 |
| DBI wax, 91° C | 5 |
| "Surfex" filler (calcium carbonate of low oil adsorption) | 5 |
| Peacock blue | 12 |
| Milori blue | 3 |
| | 99 |

Thus, the present invention provides not only new bright colored thermo-fluid printing inks and colored inks suitable for multi-color printing, but also light-colored or pale thermo-fluid ink vehicles which are well suited for the compounding of ink of almost any color. The physical qualities of these inks and vehicles make them especially useful for high speed letter-press printing according to the "Cold Set" process.

The new inks generally are free from volatile solvents, thermo-setting qualities or other unstable material such as would cause them to change materially in consistency and printing qualities under the conditions encountered in their use on a printing press. It will be understood, however, that small proportions of such materials might be included in the ink for special purposes while still utilizing the new features of this invention.

It also will be evident that the various details, ingredients and proportions referred to hereinabove may be varied within the scope of the appended claims without departing from my invention, and I therefore desire that the invention be accorded a scope commensurate with its contributions to the art, as limited only by the fair requirements of the claims.

I claim:

1. A normally solid thermo-fluid printing ink comprising coloring matter incorporated in a vehicle made with a resin base which consists substantially entirely of hard thermo-plastic product of reactions between a phenol an aldehyde and a resin from the group consisting of thermo-plastic natural resins and their polyhydric alcohol esters, together with a larger proportion of hard thermo-plastic resin from the group consisting of cumarone resins and hard thermoplastic rosin derivatives which contain the rosin nucleus.

2. A normally solid thermo-fluid printing ink comprising coloring matter incorporated in a light-colored vehicle which contains a hard thermoplastic resin base composed substantially entirely of thermo-plastic natural resin ester reacted with phenol-formaldehyde resin and a preponderant proportion of hard thermo-plastic resin from the group consisting of cumarone resins and hard thermoplastic rosin derivatives which contain the rosin nucleus.

3. A light-colored normally solid thermo-fluid printing ink vehicle having a hard resin base composed substantially entirely of: a thermoplastic product of the reaction between ester gum and a smaller amount of heat-convertible phenol-formaldehyde resin, together with a preponderant proportion of hard thermo-plastic cumarone resin.

4. A light-colored normally solid thermo-fluid printing ink vehicle having a hard resin base composed substantially entirely of: a thermoplastic product of reactions between copal, glycerol and heat-convertible phenol aldehyde resin, together with a preponderant proportion of hard thermo-plastic resin from the group consisting of cumarone resins and hard thermoplastic rosin derivatives which contain the rosin nucleus.

5. A light-colored normally solid thermo-fluid printing ink comprising coloring matter incorporated in a vehicle consisting principally of hard thermo-plastic resins and hard waxy material, said resins including a substantial proportion of a thermo-plastic product of reactions between thermo-plastic natural resin, glycerol and heat-convertible phenol aldehyde resin, and more than half of said resins being hard thermo-plastic resin from the group consisting of hard thermoplastic cumarone resins and rosin derivatives which contain the rosin nucleus.

6. A normally solid thermo-fluid printing ink having a vehicle which consists almost entirely of hard thermo-plastic resins and hard waxy material as described in claim 5, together with a substantial proportion but less than 30% of non-volatile, liquid, organic plasticizing material.

7. A thermo-fluid printing ink comprising coloring material incorporated in a normally solid light-colored vehicle containing about 20 to 50% of resin from the group consisting of hard thermo-plastic cumarones and rosin derivatives which contain the rosin nucleus and a smaller proportion between about 5 and 35% of a hard thermo-plastic product of the reaction between a glycerol ester of natural resin and a heat-convertible phenol-formaldehyde resin.

8. A thermo-fluid printing ink comprising coloring material incorporated in a normally solid light-colored vehicle containing about 20 to 50% of resin from the group consisting of hard thermo-plastic cumarones and rosin derivatives which contain the rosin nucleus, about 5 to 35% of a hard thermo-plastic product of the reaction between a glycerol ester of natural resin and heat-convertible phenol-formaldehyde resin, and most of the remainder hard waxy material.

9. A thermo-fluid printing ink comprising coloring matter incorporated in a normally solid light-colored vehicle consisting substantially entirely of about 20 to 50% of resin from the group consisting of hard thermo-plastic cumarones and rosin derivatives which contain the rosin nucleus, a smaller proportion between about 5 and 35% of a hard thermo-plastic product of the reaction between a glycerol ester of natural resin and heat-convertible phenol-formaldehyde resin, a substantial proportion but less than 30% of liquid organic plasticizing material and a substantial proportion of hard waxy material.

10. A thermo-fluid printing ink comprising coloring matter incorporated in a normally solid light-colored vehicle consisting almost entirely of about 20 to 40% of hard thermo-plastic cumarone resin, a smaller proportion between about 10 and 30% of a hard thermo-plastic product of the reaction between a glycerol ester of natural resin and heat-convertible phenol-formaldehyde resin, about 40 to 50% of hydrogenated soya bean oil, and a small amount of other hard waxy material.

11. A normally solid printing ink comprising coloring matter incorporated in a vehicle having a hard resin base composed substantially entirely of a hard thermo-plastic product of reactions between a phenol, an aldehyde and a resin from the group consisting of thermo-plastic natural resins and their polyhydric alcohol esters, together with a preponderant proportion of a hardened rosin.

LOTHIAN M. BURGESS.